Figure 1:
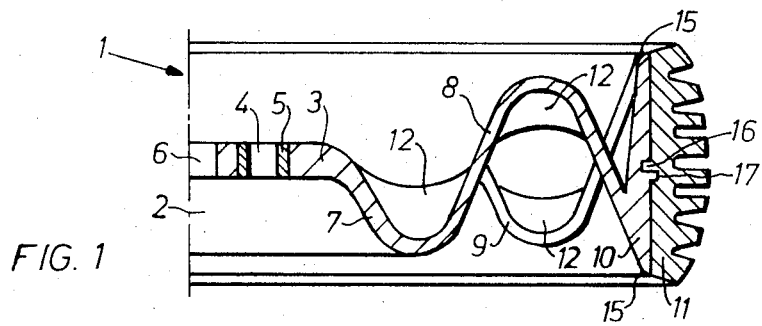

United States Patent [19]

Knipp

[11] 3,870,372
[45] Mar. 11, 1975

[54] VEHICLE WHEEL

[75] Inventor: Ulrich Knipp, Schildgen-Nittum, Germany

[73] Assignee: Bayer Aktiengesellschaft, Leverkusen, Germany

[22] Filed: May 22, 1974

[21] Appl. No.: 472,009

[30] Foreign Application Priority Data
June 6, 1973 Germany............................ 2328794

[52] U.S. Cl............................. 301/63 PW, 301/5 R
[51] Int. Cl............................................. B60b 5/00
[58] Field of Search... 301/5 R, 63 R, 63 PW, 64 R, 301/65, 66

[56] References Cited
UNITED STATES PATENTS
3,604,756  9/1971  Gruber............................ 301/63 PW Primary Examiner—Robert S. Ward, Jr.
Assistant Examiner—D. W. Keen
Attorney, Agent, or Firm—Gene Harsh

[57] ABSTRACT

A molded plastic wheel for a motor vehicle or the like has a body with a substantially flat disk provided with means for attaching the wheel to the vehicle and a webbing integral with the disk and a rim about the peripheral edge of the body, the webbing being divided into a first section adjacent to the disk which is curved into the shape of one-half of a sinusoidal wave and a second section which is divided into circumferentially spaced areas current in a direction opposite from that of the first section into the shape of one-half of a sinusoidal wave, and disposed in the spaces between the said areas, areas which are curved into the shape of at least one-half of a sinusoidal wave in a direction opposite from the areas they separate.

13 Claims, 2 Drawing Figures

VEHICLE WHEEL

This invention relates generally to wheels for vehicles and more particularly to a novel plastic wheel.

So-called solid wheels for vehicles have been known for some time. They are still in use even today, for example, in the form of polyamide rollers for low-speed vehicles. The heretofore available solid wheels have comparatively very high masses and are very limited in their elasticity. Accordingly, they are unsuitable to high-speed vehicles.

Wheels consisting of a solid rim and an elastomeric tread are suitable for extremely high loads, although they are limited in their resilience and also have the disadvantage of extremely high masses. Typical fields of application include guide rollers for caterpillar tracks, wheels for forklift trucks and supporting rollers for escalators. They are not suitable for high-speed vehicles because the cost of additional suspension and shock-absorption for the vehicle would be excessive.

Hitherto, it has been necessary to use steel wheels and pneumatic tires on high-speed vehicles. The steel wheels have a so-called dish and a rim welded to it. Wheels cast or pressed from lightweight metals are also used to a limited extent instead of steel wheels. They have the advantage over steel wheels of a lower mass which, in vehicle manufacture, has the economic advantage that the cost involved in suspending the non-sprung masses, i.e., the wheels, can be kept comparatively low.

Recently, wheels have also been made from plastics, especially fiber-reinforced plastics. In this case, the proven form of metal wheels has been retained and it is only because of the lower specific load-bearing capacity of plastics materials of the kind referred to above that the wheel has been strengthened accordingly, especially in the vicinity of the rim, to receive pneumatic tires. By using plastics for conventional rim construction, it is possible to reduce this non-sprung mass to around 50% of the mass of a comparable steel rim. This provides the vehicle with better suspension and with better road-holding properties, thus increasing its safety.

In these known structures, the actual springing of the wheel is left solely to the steel-reinforced or fabric-reinforced pneumatic tire. This torus-like structure is under an excess air pressure of about 1 to 10 kp/cm$^2$. The excess air pressure causes the tire cover to expand, presses it against the edges of the rim and thus insures that the tire sits firmly on the rim. The pneumatic tire is dimensionally stabilized by means of steel wires in its base and by means of textile-fabric reinforcing system. More recently, however, pneumatic tires have been dimensionally stabilized to an increasing extent with steel fabric reinforcing systems. Accordingly, it is apparant that a comparatively high outlay in terms of weight is required in the vicinity both of the base and of the side walls of the tire to obtain the required spring effect in the tread. In addition to the disadvantage of the relatively heavy weight of the pneumatic tire, the manufacture of the tire is expensive both in terms of labor costs and in capital investment. The manufacture of a suitable pneumatic tire requires that different rubber mixtures and adhesives be used to the reinforcing inlays. Also the semi-LeA 15,103 finished products must be manufactured in the form of sections and webs which are combined in a mold and vulcanized. Such extremely complicated and different working operations are extremely expensive to control.

For these reasons, there has been many attempts in the past to introduce more simple wheel and tire assemblies, for example, based on plastics technology, to replace the pneumatic tire and the complicated processes by which it is produced. For example, U.S. Pat. No. 3,208,500 and German Offenlegungsschrift No. 2,133,346 disclose vehicle tires which have the same torus-like configuration as pneumatic tires of rubber and fabric, but which are self-supporting so that they do not have to be filled with compressed air. The bearing strength and elasticity of the tire are obtained by using a highly elastic, but very stiff material. However, these constructions are as difficult to manufacture as the pneumatic tire and mounting the tire on the rim without internal air pressure in complicated.

Numerous attempts to use a tire body with a foamed elastic inlay or filling instead of the conventional inflated pneumatic tire of elastomeric materials have also proved fruitless. Reference is made in this connection to the embodiments disclosed in U.S. Pat. No. 2,902,072 and German Patent Specification Nos. 117,429 and 829,260.

It is an object of this invention to provide an improved plastic wheel adapted to be used with a simple rubber-like solid tread. Another object of the invention is to provide a molded plastic wheel having a solid tire or rubber-like tread removably secured thereto which is adapted to be used on motor vehicles which may be driven at high speeds.

Another object of the present invention to provide a wheel for high-speed vehicles which has low inertia forces, is highly resilient and merely requires a tread, i.e., does not require a pneumatic tire.

Figure 2:
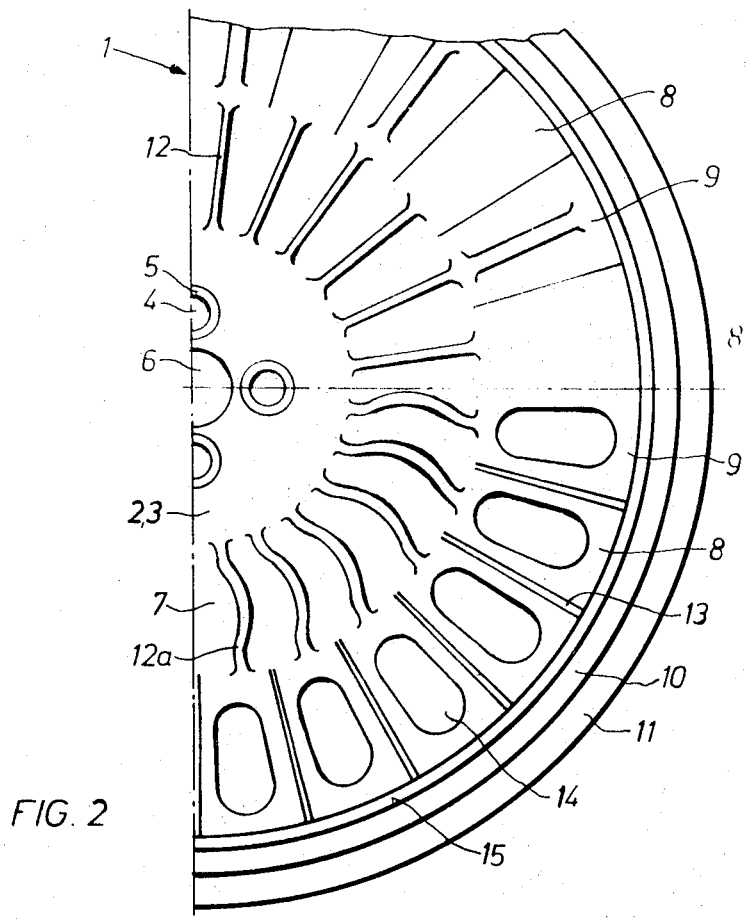

Other objects will become apparant from the following description with reference to the accompanying drawing wherein FIG. 1 is a fragmentary section through one embodiment of the wheel, and FIG. 2 is a fragmentary plan view of embodiments of the invention, the upper and lower halves of the Figure showing different embodiments.

The foregoing objects and others are accomplished in accordance with the invention, generally speaking, by providing a molded one-piece plastic wheel having an integral circular substantially plate-like body member and a rim adapted to support a solid tire or tread wherein the body member has (a) a centrally disposed disk having an opening therein adapted to receive a hub and a plurality of circumferentially spaced holes for securing the wheel to the vehicle, a webbing (b) integral with the disk and extending radially outwardly therefrom, the webbing being curved into the shape of one-half of a sinusoidal curve and integral with a plurality of circumferentially spaced webs (c) which extend radially outwardly from (b) and are integral with the rim, the webs (c) being curved in a direction opposite from that of the webbing (b) into one-half of a sinusoidal curve and combining with (b) to complete a sinusoidal curve, and webs (d) which are integral with webbing (b) and the rim and are disposed in the spaces between webs (c), webs (d) being curved in a direction opposite to that of (c) and curved into a shape corresponding to at least one of the waves of a sinusoidal curve, or in other words, corresponding to the shape of one-half of a sinusoidal curve. This invention therefore provides a plastic wheel adapted for use on motor vehicles, comprising a dish whose base is provided with bores for the hub fixing bolts and preferably has a central hole, webs leading from the dish to a concentric rim which is provided with a tread.

The plastics wheel provided by the invention has, as seen in cross-section, a base or body member disk joined to a rim by alternate webs curved into the shape of half a sinusoidal wave and oppositely curved webs in the form of at least half a sinusoidal wave.

A vehicle wheel formed in this way has favorable resilience properties, a high degree of stability and is relatively simple to manufacture. It can be manufactured, for example, by a combinded chemical reaction and/or injection-molding method which may be carried out in conjunction with centrifugal casting for forming the tread. Any suitable plastic may be used such as, for example, a polyurethane, epoxide resin, unsaturated polyester resin, methyl methacrylate of polyimide plastic. Also thermoplastic resins are suitable as f.e. nylon, polycarbonates, therephthalic polyesters and polypropylene. In addition to these materials with constant physical properties, it is also possible to use a combination of materials with differing properties. According to the invention, this can be done by initially introducing into the mold used to produce the wheel a material that is soft in its final state, followed by a material that is hard in its final state. It is also possible, for example, initially to introduce a material without any reinforcing fibers and subsequently to introduce another material or the same material with embedded reinforcing fibers such as fiber glass. Special effects can be obtained by applying processes which result in the formation of so-called integral skinned foams (German Auslegeschrift No. 1,694,138 and German Patent Specification No. 1,233,578). The plastics used should have a modulus of elasticity of from 1,000 to 100,000 kp/cm$^2$, preferably from 5,000 to 40,000 kp/cm$^2$. Dyes can be added to color the plastics material used to produce the vehicle wheel. In this way the wheel body can be colored throughout so that surface scratches are not noticeable which constitutes a considerable advantage. In addition, it is, of course, possible to coat the surface of the wheel by lacquering, metal-vapor deposition, electroplating or the like.

In a preferred embodiment of the vehicle wheel provided by the invention, the alternating webs extend substantially tangentially into the rim in opposite directions. This considerably increases the spring effect and ensures that lateral forces are effectively absorbed.

In an alternate embodiment the webs extend perpendicularly into the rim. In this case, however, the junction between web and rim is exposed to heavier stressing than in the previous embodiment.

The base of the dish is preferably reinforced, for example, by metal or fiber inlays. In this way, the wheel is advantageously strengthened in this zone so that it is able to transmit applied forces to the hub.

In another particular embodiment of the vehicle wheel according to the invention, the rim is wider than the overall width of the curved webs in the axial direction. In this way, the webs do not project beyond the wall of the rim, thus preventing damage by collision with a curbstone, etc.

The rim is preferably rectangular in cross-section or, in a second embodiment, has a cross-section that increases towards the webs.

There are, of course, other satisfactory embodiments for this purpose. In particular, however, it is important to insure that, in cases where the wheel is produced in a mold, it can readily be released from that mold.

The edges of the rim are preferably broken, i.e., bevelled or rounded off. This reduces the danger of damage in the event of collision with curbstones or other obstacles.

In one particular embodiment of the arrangement according to the invention, the peripheral surface of the rim is contoured, for example, in the form of recesses or projections. This provides the tread with particularly firm adhesion to the rim. The tread itself can be applied for example by shrinking a ring-shaped tread on the rim. Alternately, it can be injected molded on the rim. In some cases, the tread and wheel body can be produced in a single mold by successively injecting different material into the mold. In this case, the tread is preferably formed by centrifugal casting.

In another embodiment of the vehicle wheel of the invention, the webs are formed with openings. The resilience properties can be varied by varying the size and number of these openings.

On the other hand, however, the resilience and strength properties of the vehicle wheel can be influenced by reinforcing ribs on the webs and/or on the edge of the dish in another embodiment of the invention. These reinforcing ribs can be profiled, as can be the webs, so that the resilience and strength properties can also be varied in this way.

One-half of the vehicle wheel provided by the invention is illustrated purely diagrammatically in the accompanying drawing and described in more detail in the following.

Vehicle wheel 1 has a plate-like body member or dish 2, whose centrally disposed disk or base 3 is provided with bores 4 in metal sleeves 5 inserted in the dish 2. Bores 4 are adapted to cooperate with conventional bolts and nuts to secure the wheel to a vehicle. The middle of the base 3 has a central hole 6 through which the hub of the wheel (not shown) can project. The base 3 of the dish is integral with an edge or intermediate webbing section 7 in the shape of half of a sinusoidal wave. This section 7 is in turn integral with alternate circumferentially spaced webs 8 in the shape of at least half a sinusoidal wave and with oppositely curved webs 9 in the spaces between webs 8 and in the form of at least half a sinusoidal wave. These webs 8 and 9 terminate in a rim 10 on which a tread 11 is arranged.

The semi-sinusoidal wave of the intermediate portion 7 of the dish is reinforced by radially extending circumferentially spaced ribs 12 and 12a, the ribs 12a (lower half of the wheel) having an additional curvature while rib 12 is flat. In the illustration of the lower half of the wheel, the webs 8. 9 in a modified illustration of the upper half of the wheel are spaced at a distance 13 apart from one another and comprise openings 14. The rim 10 is provided with bevels 15. In addition, it is contoured around its peripheral surface in the form of encircling recesses 16 and projections 17 (FIG. 1).

The wheel body of this preferred embodiment is made of a polyurethane-based plastics material, while the tread 11 is made of conventional tire rubber.

Although this invention has been described in detail for the purposed of illustration, it is to be understood that such detail is solely for that purpose and that variations can be made therein by those skilled in the art without departing from the spirit and scope of the invention except as it may be limited by the claims.

What is claimed is:

1. A plastic vehicle wheel comprising a dish, means for securing the dish to a hub, a concentric rim carried on the peripheral edge of the dish, webs leading from the dish to the rim, a tread secured to the rim, said dish having a centrally disposed base, and between the base and rim, an intermediate web portion in the form of half a sinusoidal wave integral with the base and integral with a number of circumferentially spaced webs curved into the form of at least half a sinusoidal wave, said intermediate portion being integral with oppositely curved webs in the shape of at least half a sinusoidal wave, disposed in the spaces between the first said webs, both webs terminating in the rim.

2. The vehicle wheel of claim 1 wherein the circumferentially spaced webs and the webs therebetween run substantially tangentially into the rim in opposite directions.

3. The vehicle wheel of claim 1 wherein the circumferentially spaced webs and webs therebetween run perpendicularly into the rim.

4. The vehicle wheel of claim 1 wherein the base of the dish has reinforced openings adapted to receive bolts carried by the vehicle.

5. The vehicle wheel of claim 1 wherein the rim is wider than the overall width in the axial direction of the curved webs adjacent thereto.

6. The vehicle wheel of claim 1 wherein the rim has a rectangular cross-section.

7. The vehicle wheel of claim 1 wherein the rim has a cross-section increasing towards the webs.

8. The vehicle wheel of claim 1 wherein the rim has broken edges.

9. The vehicle wheel of claim 1 wherein the peripheral surface of the rim is contoured.

10. The vehicle wheel of claim 1 wherein the webs adjacent the rim are provided with openings.

11. The vehicle wheel of claim 1 wherein said webs adjacent the rim are reinforced with ribs.

12. The vehicle wheel of claim 1 wherein the webs adjacent to the rim are spaced from each other.

13. A molded plastic wheel comprising a circular plate-like body and a rim adapted to support a tread integral with the body, said body having a centrally disposed substantially flat disk portion (a) with an opening therethrough to receive a hub and means for securing the wheel to a vehicle, said body having a first circular web portion (b) integral with the disk and curved into the shape of one-half of a sinusoidal curve and integral with a plurality of circumferentially spaced webs (c) which extend radially outwardly from (b) and are integral with the rim, the webs (c) being curved in a direction opposite from web (b) into the shape of one-half of a sinusoidal curve, and webs (d) disposed in the space between webs (c) and integral with (b) and the rim, webs (d) being curved in a direction opposite to (c) into the shape of at lease one-half of the sinusoidal curve.

* * * * *